US011705802B2

(12) United States Patent
Yamane (10) Patent No.: US 11,705,802 B2
(45) Date of Patent: Jul. 18, 2023

(54) INTEGRATED CIRCUIT AND POWER SUPPLY CIRCUIT

(71) Applicant: FUJI ELECTRIC CO., LTD., Kawasaki (JP)

(72) Inventor: Hiroki Yamane, Matsumoto (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 52 days.

(21) Appl. No.: 17/183,099

(22) Filed: Feb. 23, 2021

(65) Prior Publication Data
US 2021/0175791 A1 Jun. 10, 2021

Related U.S. Application Data

(63) Continuation of application No. PCT/JP2020/003655, filed on Jan. 31, 2020.

(30) Foreign Application Priority Data

Mar. 11, 2019 (JP) ................ 2019-043576

(51) Int. Cl.
*H02M 1/08* (2006.01)
*H02M 1/42* (2007.01)
(Continued)

(52) U.S. Cl.
CPC ........... *H02M 1/08* (2013.01); *H02M 1/4208* (2013.01); *H02M 7/21* (2013.01); *H02M 1/0009* (2021.05)

(58) Field of Classification Search
CPC ........ H02M 1/00; H02M 1/0009; H02M 1/08; H02M 1/4208; H02M 7/00; H02M 7/21
See application file for complete search history.

(56) References Cited

U.S. PATENT DOCUMENTS

2006/0061337 A1 3/2006 Kim et al.
2009/0323374 A1 12/2009 Park et al.
(Continued)

FOREIGN PATENT DOCUMENTS

JP 2006-094697 A 4/2006
JP 2007-074813 A 3/2007
(Continued)

OTHER PUBLICATIONS

"Critical Conduction Mode PFC Controller", FAN7930, 2010 Fairchild Semiconductor Corporation, Apr. 2010.
(Continued)

*Primary Examiner* — Diana J. Cheng
*Assistant Examiner* — Dave Mattison
(74) *Attorney, Agent, or Firm* — Rabin & Berdo, P.C.

(57) ABSTRACT

An integrated circuit for a power supply circuit that includes a transformer and a transistor controlling an inductor current flowing through a primary winding of the transformer. The integrated circuit includes a terminal receiving a voltage corresponding to the voltage of a secondary winding of the transformer when the transistor is in an off-state, a first detection circuit detecting that the inductor current is smaller than a first current value, and a determination circuit determining whether an AC voltage applied to the primary winding of the transformer is a first or second AC voltage, both based on the received voltage in the off-state of the transistor. The integrated circuit is configured to drive the transistor in response to a detection result of the first detection circuit, a determination result of the determination circuit, and an output voltage of the power supply circuit generated from the AC voltage.

18 Claims, 7 Drawing Sheets

(51) Int. Cl.
*H02M 7/21* (2006.01)
*H02M 1/00* (2006.01)

(56) References Cited

U.S. PATENT DOCUMENTS

| | | | |
|---|---|---|---|
| 2010/0002474 A1* | 1/2010 | Moon | H02M 1/4225 363/21.18 |
| 2013/0249421 A1* | 9/2013 | Cavallini | H05B 45/00 315/193 |
| 2014/0085949 A1 | 3/2014 | Sugawara | |
| 2017/0077825 A1 | 3/2017 | Yamane | |

FOREIGN PATENT DOCUMENTS

| | | |
|---|---|---|
| JP | 2008-199896 A | 8/2008 |
| JP | 2011-091900 A | 5/2011 |
| JP | 2014-082924 A | 5/2014 |
| JP | 2017-060271 A | 3/2017 |

OTHER PUBLICATIONS

"Enhanced, High-Efficiency Power Factor Controller", NCP1611/D, Semiconductor Components Industries, LLC, Jan. 2015.

International Search Report for PCT/JP2020/003655, dated Mar. 10, 2020.

* cited by examiner

INTEGRATED CIRCUIT AND POWER SUPPLY CIRCUIT

CROSS-REFERENCE TO RELATED APPLICATIONS

This is a continuation application of International Patent Application No. PCT/JP2020/003655 filed Jan. 31, 2020, which claims the benefit of priority to Japanese Patent Application No. 2019-043576 filed Mar. 11, 2019, the entire contents of each of which the entire contents of each of which are incorporated herein by reference.

BACKGROUND

Technical Field

The present disclosure relates to an integrated circuit and a power supply circuit.

Description of the Related Art

In a power factor correction circuit (PFC circuit) in a typical critical mode, a transistor that controls an inductor current flowing through an inductor is turned on when the inductor current becomes substantially zero. Then, when a predetermined time has elapsed since the turning-on of the transistor, the transistor is turned off. As a result, the waveform indicating the peak of the inductor current is similar to the waveform of a rectified current, to thereby improve the power factor (for example, Japanese Patent Application Publication No. 2014-82924).

An integrated circuit for a power factor correction circuit controls on and off of a transistor generally based on many currents and voltages such as the inductor current, the rectified voltage, and the output voltage. Accordingly, when there are multiple currents and voltages to be detected, the number of terminals in the integrated circuit may increase.

The present disclosure is directed to provision of an integrated circuit that can suppress an increase in the number of terminals even when there are multiple detection targets.

SUMMARY

A primary aspect of the present disclosure is an integrated circuit for a power supply circuit that includes a transformer including a primary winding to which a rectified voltage obtained by rectifying an alternating-current (AC) voltage is applied, and a secondary winding configured to induce a voltage having a polarity opposite to a polarity of a voltage generated in the primary winding, and a transistor configured to control an inductor current flowing through the primary winding, the integrated circuit being configured to drive the transistor, the integrated circuit comprising: a terminal configured to receive a voltage corresponding to the voltage of the secondary winding when the transistor is in an off-state; a first detection circuit configured to detect that a current value of the inductor current is smaller than a first current value, based on the received voltage in the off-state of the transistor; and a determination circuit configured to determine whether the AC voltage is a first AC voltage or a second AC voltage having an amplitude greater than an amplitude of the first AC voltage, based on the received voltage in the off-state of the transistor, the integrated circuit being configured to drive the transistor in response to a detection result of the first detection circuit, a determination result of the determination circuit, and an output voltage of the power supply circuit generated from the AC voltage.

In addition, a secondary aspect of the present disclosure is a power supply circuit, comprising: a transformer including a primary winding to which a rectified voltage obtained by rectifying an alternating-current (AC) voltage is applied, and a secondary winding configured to induce a voltage having a polarity opposite to a polarity of a voltage generated in the primary winding; a transistor configured to control an inductor current flowing through the primary winding of the transformer; and an integrated circuit configured to drive the transistor, the integrated circuit including: a terminal configured to receive a voltage corresponding to the voltage of the secondary winding of the transformer when the transistor is in an off-state; a first detection circuit configured to detect that a current value of the inductor current is smaller than a first current value, based on the received voltage in the off-state of the transistor; and a determination circuit configured to determine whether the AC voltage is a first AC voltage or a second AC voltage having an amplitude greater than an amplitude of the first AC voltage, based on the received voltage in the off-state of the transistor, the integrated circuit being configured to drive the transistor in response to a detection result of the first detection circuit, a determination result of the determination circuit, and an output voltage of the power supply circuit generated from the AC voltage.

DETAILED DESCRIPTION

At least following matters will become clear from the descriptions of the present specification and the accompanying drawings.

Configuration of Embodiment

Figure 1:
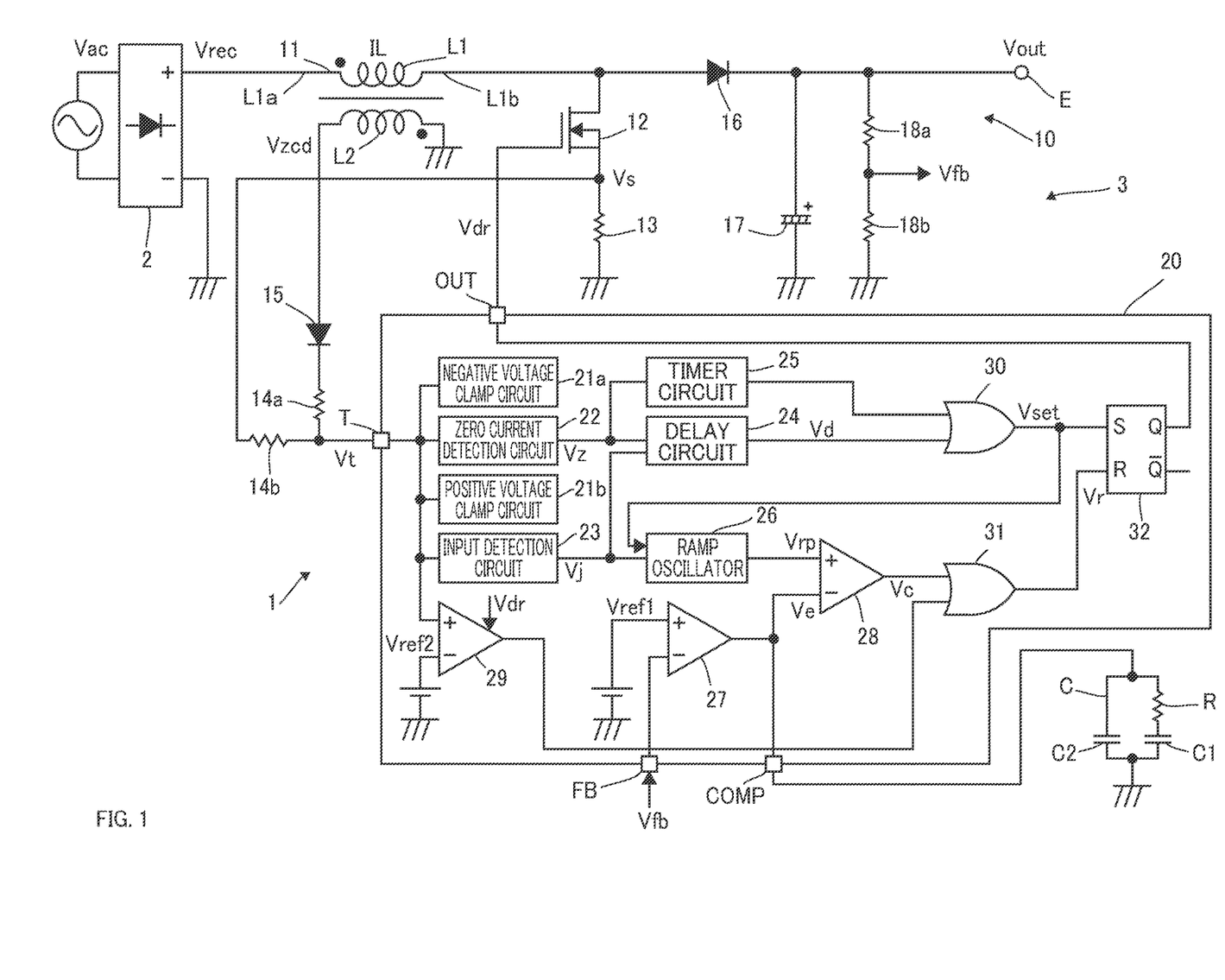
FIG. 1 is a diagram illustrating an example of a configuration of an AC-DC converter.

FIG. 1 is a diagram illustrating an example of a configuration of an AC-DC converter 1. The AC-DC converter 1 (power supply circuit) is a circuit that generates an output voltage Vout of a target level from an AC voltage Vac and outputs the output voltage Vout to a terminal E. The AC-DC converter 1 includes a rectifier circuit 2 and a power factor correction circuit 3.

The rectifier circuit 2 full-wave rectifies the applied AC voltage Vac, and outputs the full-wave rectified voltage to the power factor correction circuit 3 as a rectified voltage Vrec.

The power factor correction circuit 3 improves the power factor of the rectified voltage Vrec, and includes a chopper circuit 10 and a drive circuit 20.

The chopper circuit 10 boosts the rectified voltage Vrec, to generate the output voltage Vout. The chopper circuit 10 includes a transformer 11; a transistor 12; a current sensing resistor 13; voltage divider resistors 14a, 14b; diodes 15, 16; a capacitor 17; and voltage divider resistors 18a, 18b.

The transformer 11 includes a primary winding L1 and a secondary winding L2 magnetically coupled to the primary winding L1. The secondary winding L2 is wound such that a voltage generated in the secondary winding L2 has a polarity opposite to the polarity of a voltage generated in the primary winding L1. Accordingly, a secondary winding voltage (hereinafter, the voltage Vzcd) having the polarity opposite to that of the primary winding L1 is generated in the secondary winding L2 according to the turns ratio between the number of turns of the primary winding L1 (hereinafter, the number of primary turns Np) and the number of turns of the secondary winding L2 (hereinafter, the number of secondary turns Ns). Note that one end Lia of the primary winding L1 is coupled to the rectifier circuit 2.

The transistor 12 is an n-type metal oxide semiconductor (NMOS) transistor that controls power supplied to a load coupled to the terminal E. The transistor 12 is turned on and off in response to a drive signal Vdr outputted from a terminal OUT of the drive circuit 20. The transistor 12 thereby changes an inductor current IL of the primary winding L1. Note that the transistor 12 is not limited to the NMOS transistor, and may be other semiconductor devices such as a bipolar transistor, an insulated gate bipolar transistor (IGBT) or the like.

The current sensing resistor 13 converts the inductor current IL flowing through the primary winding L1 into a voltage, in response to turning on of the transistor 12. The current sensing resistor 13 is provided between the transistor 12 and a ground GND. The current sensing resistor 13 has a predetermined resistance value that is sufficiently smaller than the resistance values of the voltage divider resistors 14a, 14b. A voltage generated in the current sensing resistor 13 in an on-state of the transistor 12 is referred to as the voltage Vs.

The voltage divider resistors 14a, 14b divide a voltage outputted from the diode 15, and apply the divided voltage to a terminal T when the diode 15 is on. Note that the voltage divider resistors 14a, 14b are provided in series on a current path between the secondary winding L2 and the ground GND. A node between the voltage divider resistors 14a and 14b is coupled to the terminal T.

The diode 15 is a device for applying the voltage Vzcd generated in the secondary winding L2 to the terminal T. Note that the voltage Vzcd is a voltage at a node at which the secondary winding L2 and the diode 15 are coupled. The diode 15 is provided between the secondary winding L2 and the voltage divider resistor 14a. An anode of the diode 15 is coupled to the secondary winding L2 and a cathode of the diode 15 is coupled to the voltage divider resistor 14a.

The voltage Vzcd will be described with reference to FIG. 2. When the drive signal Vdr goes high (hereinafter, referred to as a high level or high) and the transistor 12 is thereby turned on, the rectified voltage Vrec is applied to the one end Lia of the primary winding L1, and a voltage of the other end Lib results in 0 V (voltage of the ground GND) if a voltage drop of the current sensing resistor 13 and the transistor 12 is ignored. In other words, the voltage on the one end Lia side of the primary winding L1 becomes higher than the voltage on the other end Lib side.

In this case, the voltage Vzcd generated in the secondary winding L2 has a polarity opposite to the polarity of the voltage across the primary winding L1, and thus the voltage Vzcd is a negative voltage lower than the ground GND. In other words, the voltage Vzcd is $Vzcd=-(2)^{1/2} \times Vrec \times (Ns/Np)$.

Meanwhile, when the drive signal Vdr goes low (hereinafter, referred to as a low level or low) and the transistor 12 is thereby turned off, the rectified voltage Vrec is applied to the one end Lia of the primary winding L1 and the output voltage Vout is applied to the other end Lib.

In this case, the voltage on the other end Lib side of the primary winding L1 becomes higher than the voltage on the one end Lia side, and thus the voltage Vzcd of the secondary winding L2, which is $Vzcd=(Vout-(2)^{1/2} \times Vrec \times (Ns/Np))$, is generated.

Figure 2:
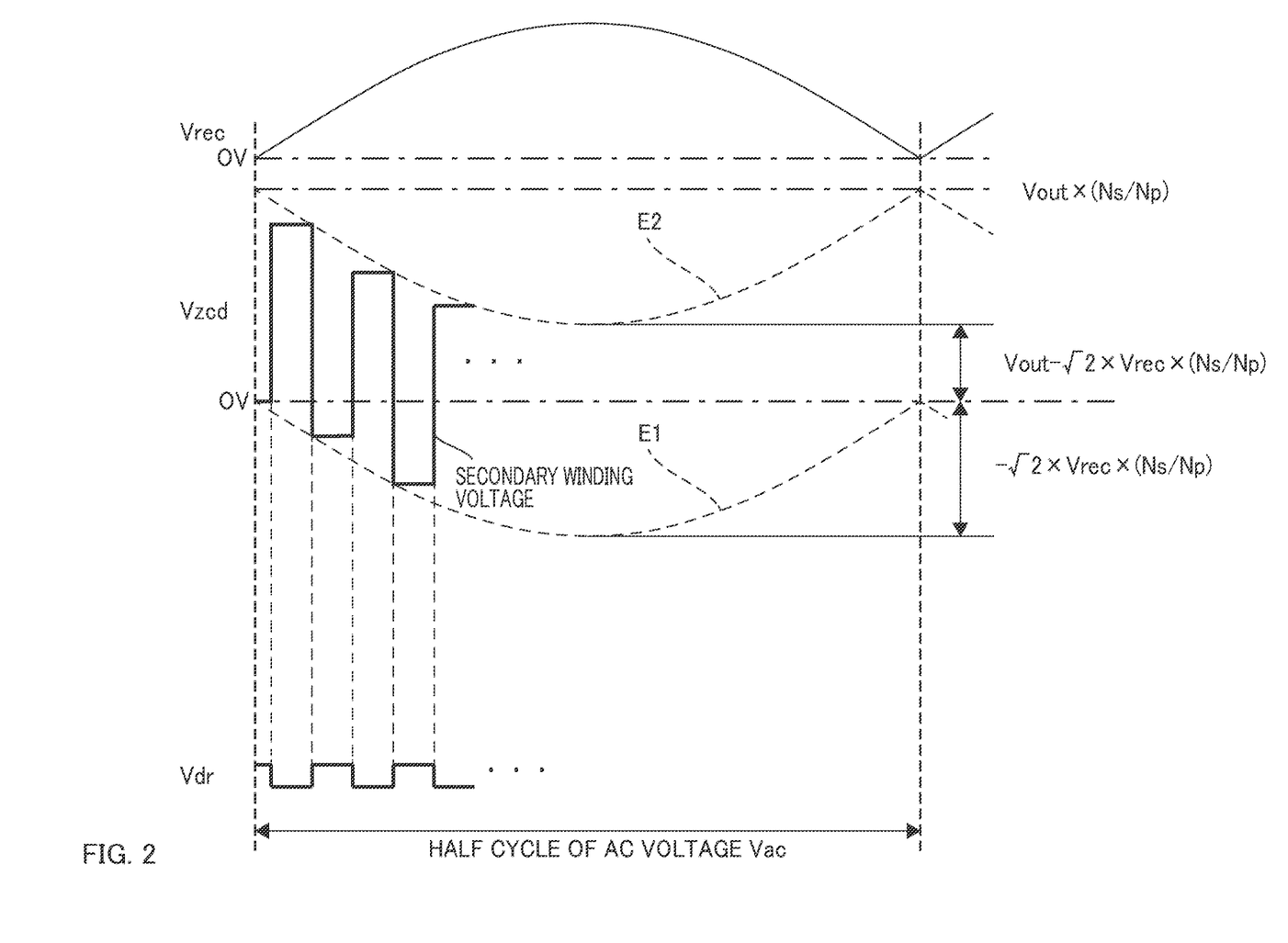
FIG. 2 is a diagram illustrating an example of a waveform of a voltage Vzcd.

Accordingly, as illustrated in FIG. 2, when the transistor 12 is on, the voltage Vzcd changes along an envelope E1 given by $Vzcd=-(2)^{1/2} \times Vrec \times (Ns/Np)$. Meanwhile, when the transistor 12 is off, the voltage Vzcd changes along an envelope E2 given by $Vzcd=Vout-(2)^{1/2} \times Vrec \times (Ns/Np)$ that is a positive voltage.

As described above, in the on-state of the transistor 12, the voltage Vzcd is a negative voltage, and thus the diode 15 is off. Meanwhile, the turns ratio "Ns/Np" is set such that the voltage Vzcd is sufficiently higher than a forward voltage of the diode 15 in the off-state of the transistor 12. Accordingly, the diode 15 is on in the off-state of the transistor 12. Thus, in an embodiment of the present disclosure, a voltage corresponding to the voltage Vzcd is applied to the terminal T only in the off-state of the transistor 12.

The diode 16 is a device that discharges energy stored in the primary winding L1 to the output side, in the off-state of the transistor 12. An anode of the diode 16 is coupled to the primary winding L1 and the transistor 12, and a cathode of the diode 16 is coupled to the terminal E.

The capacitor 17 removes a high-frequency component generated by a switching operation of the transistor 12 from the output voltage Vout. The capacitor 17 is provided between the cathode of the diode 16 and the ground GND.

The voltage divider resistors 18a, 18b divide the output voltage Vout, and feedback a feedback voltage Vfb. The voltage divider resistors 18a, 18b are provided in series between the terminal E and the ground GND. Anode between the voltage divider resistors 18a and 18b is coupled to a terminal FB of the drive circuit 20, which will be described later.

The drive circuit 20 drives the transistor 12 such that the output voltage Vout reaches the target level while the power factor of the AC-DC converter 1 is improved. The drive circuit 20 is, for example, an integrated circuit such as a power factor correction integrated circuit (IC), and includes the terminal T, the terminal FB, a terminal COMP, and the terminal OUT. Although the drive circuit 20 is provided with terminals other than the aforementioned four terminals, such terminals are omitted for the sake of convenience.

When the transistor 12 is on and the diode 15 is off, the voltage Vs corresponding to a current flowing through the transistor 12 is applied to the terminal T. Meanwhile, when the transistor 12 is off and the diode 15 is on, a voltage corresponding to the voltage Vzcd of the secondary winding L2 is applied to the terminal T.

Accordingly, a voltage Vt at the terminal T is Vt=Vs in the on-state of the transistor 12 and is $Vt=(Vzcd-0.7) \times R14b \div (R14a+R14b)$ in the off-state of the transistor 12. It is assumed here that the forward voltage of the diode 15 is "0.7 V", the resistance values of the voltage divider resistors 14a, 14b are R14a, R14b, and the resistance value of the current sensing resistor 13 is ignored for the sake of convenience since it is sufficiently smaller than R14a, R14b.

The feedback voltage Vfb is applied to the terminal FB, and an error voltage Ve is applied to the terminal COMP. In addition, the drive signal Vdr for driving the transistor 12 is outputted from the terminal OUT.

The drive circuit 20 outputs the drive signal Vdr in response to the voltage Vt and the feedback voltage Vfb, and drives the transistor 12. The drive circuit 20 includes a negative voltage clamp circuit 21a, a positive voltage clamp circuit 21b, a zero current detection circuit 22, an input detection circuit 23, a delay circuit 24, a timer circuit 25, a ramp oscillator 26, an error amplifier circuit 27, comparator circuits 28, 29, OR circuits 30, 31, and an SR flip-flop 32.

The negative voltage clamp circuit 21a clamps the voltage Vt at the terminal T such that the voltage Vt does not fall below a predetermined negative voltage. The negative voltage clamp circuit 21a may be configured using, for example, a Zener diode, not illustrated, having an anode coupled to the ground GND and a cathode coupled to the terminal T.

The positive voltage clamp circuit 21b clamps the voltage Vt such that the voltage Vt is equal to a predetermined positive voltage or lower. The positive voltage clamp circuit 21b may be configured using, for example, a Zener diode, not illustrated, having an anode coupled to the terminal T and a cathode coupled to a predetermined voltage.

The zero current detection circuit 22 (first detection circuit) detects whether the inductor current IL has reached zero based on the voltage Vt in the off-state of the transistor 12. It is assumed here that "zero" means, for example, that the inductor current IL has a current value of substantially zero (e.g., 1 mA). Accordingly, the zero current detection circuit 22 compares a voltage Vt2 with a threshold voltage Vth of several mV corresponding to a current of 1 mA, for example, to detect that the inductor current IL is zero.

Then, when the zero current detection circuit 22 detects that the current value of the inductor current IL is smaller than 1 mA (first current value), the zero current detection circuit 22 outputs a high signal Vz indicating that the inductor current IL has reached zero, to the delay circuit 24 and the timer circuit 25.

The input detection circuit 23 (determination circuit) outputs a determination result Vj indicating which one of multiple types of AC voltages Vac the AC voltage Vac is, based on the voltage Vt at the terminal T in the off-state of the transistor 12. Specifically, when the input detection circuit 23 determines that the AC voltage Vac is a 100 VAC voltage Vac1, the input detection circuit 23 outputs a high signal Vj (first signal) as a determination result. Meanwhile, when the input detection circuit 23 determines that the AC voltage Vac is a 200 V AC voltage Vac2, the input detection circuit 23 outputs a low signal Vj (second signal) as a determination result.

Note that the "AC voltage Vac1 (first AC voltage)" is an AC voltage of 100 V used in Japan, for example, and "AC voltage Vac2 (second AC voltage)" is an AC voltage of 220 to 240 V used in Europe, for example. The input detection circuit 23 will be described later in detail.

When the delay circuit 24 receives the high signal Vz from the zero current detection circuit 22, the delay circuit 24 outputs, to the OR circuit 30, a high signal Vd (first instruction signal) for switching on the transistor 12 after the elapse of an amount of time corresponding to the level of the signal Vj. Specifically, in a state where the high signal Vj is inputted to the delay circuit 24, the delay circuit 24 outputs the signal Vd for turning on the transistor 12, after the elapse of an amount of time td1 (first amount of time) since the detection of the inductor current IL reaching zero.

In addition, in a state where the low signal Vj is inputted to the delay circuit 24, the delay circuit 24 outputs the high signal Vd for turning on the transistor 12 after the elapse of an amount of time td2 (second amount of time) since the detection of the inductor current IL reaching zero.

Meanwhile, a delay time period td in the delay circuit 24 is set such that the transistor 12 is turned on at a timing at which a drain-source voltage Vds of the transistor 12 becomes small (for example, substantially zero). This is because loss in the transistor 12 is large, if the transistor 12 is turned on when the drain-source voltage Vds of the transistor 12 is large.

In generally, the smaller the amplitude of the AC voltage Vac is, the more slowly the drain-source voltage Vds of the transistor 12 changes. In other words, the change in the voltage Vds when the 100 V-based voltage is inputted is more gradual than the change in the voltage Vds when the 200 V-based voltage is inputted. In an embodiment of the present disclosure, the delay circuit 24 is set such that the "amount of time td2" is shorter than the "amount of time td1", to reduce the switching loss in the transistor 12. Accordingly, the switching loss in the transistor 12 is reduced in an embodiment of the present disclosure.

The timer circuit 25 turns on the transistor 12 upon activation of the drive circuit 20 and interruption of the AC voltage Vac. More specifically, when the timer circuit 25 has received no high signal Vz from the zero current detection circuit 22 for a predetermined time period, in other words, when it has not been detected for the predetermined time that the inductor current IL reaches zero, the timer circuit 25 outputs a high signal to the OR circuit 30 every predetermined time period.

When the ramp oscillator 26 (oscillator circuit) receives a high signal Vset, the ramp oscillator 26 outputs a ramp wave Vrp having a slope corresponding to the level of the signal Vj to the comparator circuit 28. Specifically, in a state where the high signal Vj is inputted to the ramp oscillator 26, the ramp oscillator 26 outputs the ramp wave Vrp having a slope S1 (first slope) in response to the input of the signal Vset.

In addition, in a state where the low signal Vj is inputted to the ramp oscillator 26, the ramp oscillator 26 outputs the ramp wave Vrp having a slope S2 (second slope) in response to the input of the signal Vset. Note that the slope S2 in an embodiment of the present disclosure is steeper than the slope S1.

The error amplifier circuit 27 outputs the error voltage Ve corresponding to an error between the level of the output voltage Vout and the target level, based on the feedback voltage Vfb and a reference voltage Vref1 serving as a reference of the target level. In addition, a resistor R and capacitors C1, C2 for phase compensation are coupled to the error amplifier circuit 27 via the terminal COMP, between an output of the error amplifier circuit 27 and the ground GND.

The comparator circuit 28 (signal output circuit) compares the error voltage Ve inputted to an inverting input terminal thereof from the error amplifier circuit 27 and the ramp wave Vrp inputted to a non-inverting input terminal thereof from the ramp oscillator 26. When the ramp wave Vrp is higher than the error voltage Ve, the comparator circuit 28 outputs a high signal Vc (second instruction signal) for turning off the transistor 12 to the OR circuit 31.

The comparator circuit 29 (second detection circuit) detects whether the inductor current IL flowing through the transistor 12 is an overcurrent based on the voltage Vt at the terminal T in the on-state of the transistor 12 and a reference voltage Vref2 corresponding to an overcurrent. Note that, in an embodiment of the present disclosure, when the inductor current IL is higher than a predetermined current value (second current value) such as several A, in other words, when the voltage Vt in the on-state of the transistor 12 is higher than the reference voltage Vref2, the comparator circuit 29 detects an overcurrent and outputs a high signal.

The comparator circuit 29 is designed to, for example, output a low signal in response to the drive signal Vdr in the state where the transistor 12 is off. Specifically, a "switch SW (not illustrated)" that is turned on and off in response to the drive signal Vdr may be provided between the output of the comparator circuit 29 and the ground GND. Then, the switch SW is turned on in response to the low drive signal Vdr, for example, and connects the output of the comparator circuit 29 to the ground GND. In addition, the switch SW disconnects the connection between the output of the comparator circuit 29 and the ground GND in response to the high drive signal Vdr. As a result, the comparator circuit 29 detects an overcurrent only when the high drive signal Vdr is inputted.

In addition, although details will be described later, when the comparator circuit 29 detects an overcurrent and the comparator circuit 29 goes high, a signal Vr of the OR circuit 31 goes high. As a result, the drive signal Vdr goes low, to thereby turn off the transistor 12. Accordingly, the transistor 12 and the like are protected from an overcurrent.

When the high signal is outputted from one of the delay circuit 24 and the timer circuit 25, the OR circuit 30 outputs the high signal Vset to the flip-flop 32.

When the high signal is outputted from one of the comparator circuits 28 and 29, the OR circuit 31 outputs the high signal Vr to the flip-flop 32.

When the high signal Vset is inputted to an S input of the flip-flop 32, the flip-flop 32 outputs the high drive signal Vdr for turning on the transistor 12. Meanwhile, when the high signal Vr is inputted to an R input of the flip-flop 32, the flip-flop 32 outputs the low drive signal Vdr for turning off the transistor 12.

<Relationship Between AC Voltage Vac and Voltage Vt>

Figure 3:
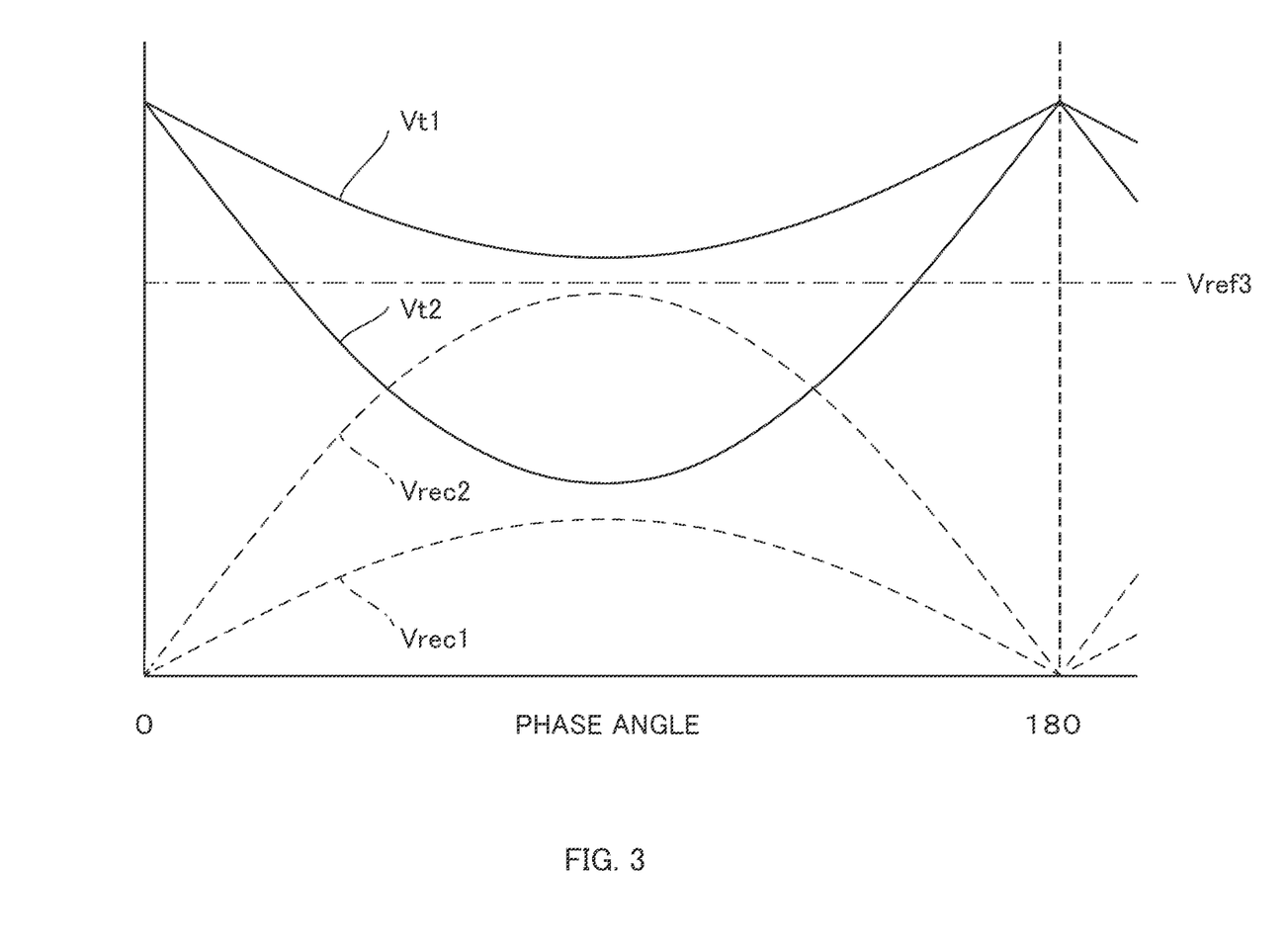
FIG. 3 is a diagram illustrating relationships among a rectified voltage Vrec, a voltage Vt at a terminal T, and a reference voltage Vrec3 with respect to alternating-current (AC) voltages Vac having different amplitudes.

FIG. 3 is a diagram illustrating examples of waveforms of rectified voltages Vrec in the case where the AC voltages Vac having different amplitudes are inputted, and waveforms of voltages Vt in the off-state of the transistor 12.

When a rectified voltage Vrec1 corresponding to the 100 V AC voltage Vac1 is inputted to the power factor correction circuit 3, the voltage outputted from the secondary winding L2 is given as follows:

$$Vzcd1 = Vout - (2)^{1/2} \times Vrec1 \times (Ns/Np) \quad (1).$$

In addition, the voltage at the terminal T in the off-state of the transistor 12 is given as follows:

$$Vt1 = (Vzcd1 - 0.7) \times R14b + (R14a + R14b) \quad (2).$$

Meanwhile, when a rectified voltage Vrec2 corresponding to the 200 V AC voltage Vac2 is inputted to the power factor correction circuit 3, the voltage outputted from the secondary winding L2 is given as follows:

$$Vzcd2 = Vout - (2)^{1/2} \times Vrec2 \times (Ns/Np) \quad (3).$$

Moreover, the voltage at the terminal T in the off-state of the transistor 12 is given as follows:

$$Vt2 = (Vzcd2 - 0.7) \times R14b + (R14a + R14b) \quad (4).$$

Accordingly, the smaller the amplitude of the AC voltage Vac is, the higher the voltage Vt at the terminal T in the off-state of the transistor 12 is. Moreover, as apparent from FIG. 3, in a half cycle of the AC voltage Vac (time period in which the phase angle changes from 0° to 180°), each of the voltages Vt1, Vt2 is the lowest when the phase angle is 90°. Further, the lowest value of the voltage Vt1 is higher than the lowest value of the voltage Vt2.

The input detection circuit 23 according to an embodiment of the present disclosure compares the voltage Vt and a reference voltage Vref3, which is set between the lowest value of the voltage Vt1 and the lowest value of the voltage Vt2, to thereby determine whether the AC voltage Vac is the 100 V AC voltage or the 200 V AC voltage.

Specifically, the input detection circuit 23 determines that the 200 V AC voltage Vac2 is inputted when there is a predetermined time period in which the voltage Vt is lower than the reference voltage Vref3. Meanwhile, the input detection circuit 23 determines that the 100 V AC voltage Vac1 is inputted when there is no time period in which the voltage Vt is lower than the reference voltage Vref3. As will be described later in detail, for example, the input detection circuit 23 can determine that there is no time period in which the voltage Vt is lower than the reference voltage Vref3, if the voltage Vt does not fall below the reference voltage Vref3 in a time period corresponding to the half cycle of the AC voltage Vac.

«Example of Input Detection Circuit 23»

Figure 4:
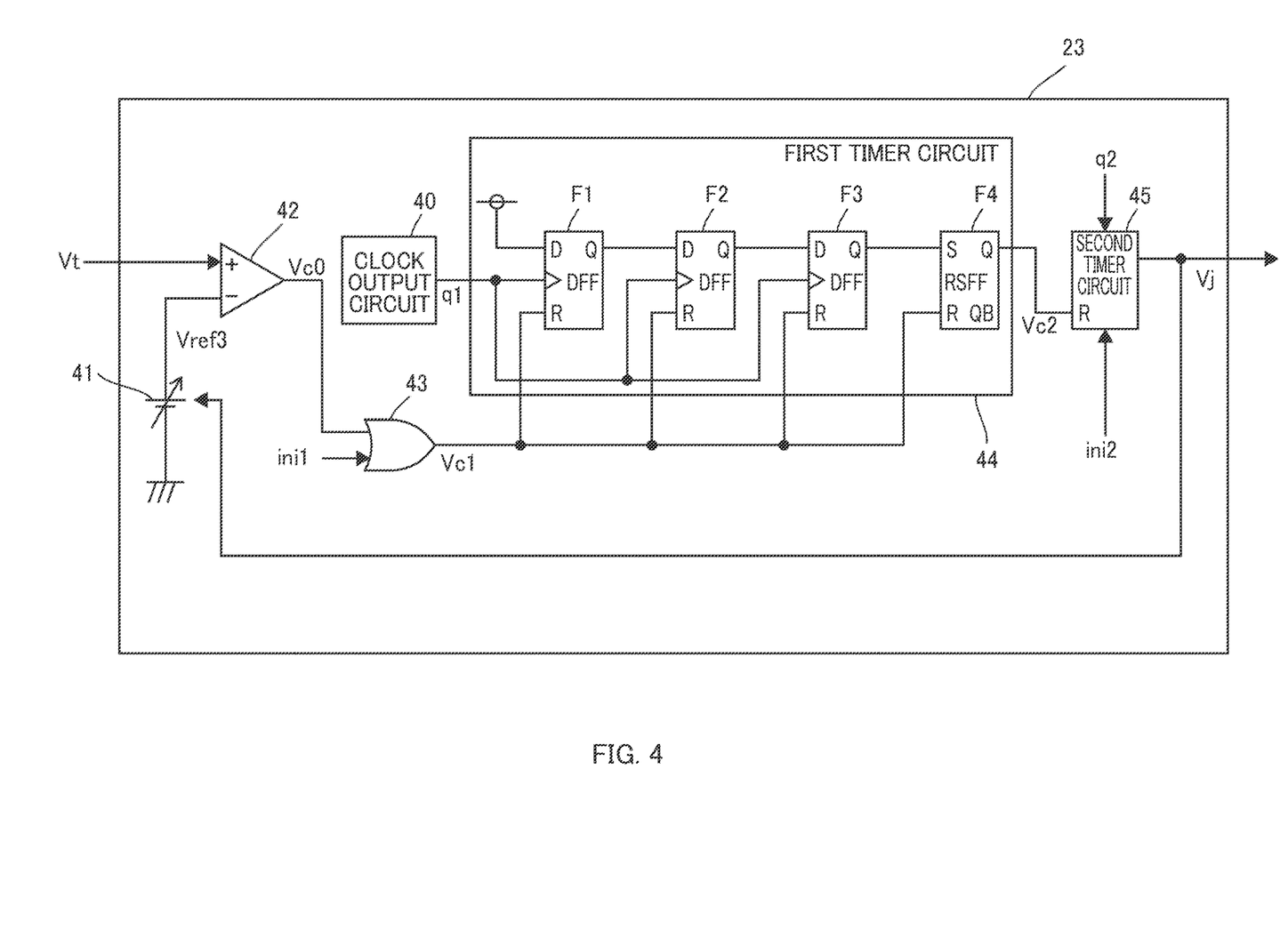
FIG. 4 is a diagram illustrating an example of an input detection circuit.

FIG. 4 is a diagram illustrating an example of the input detection circuit 23. As illustrated in FIG. 4, the input detection circuit 23 (determination circuit) includes a clock output circuit 40, a reference voltage output circuit 41, a comparator circuit 42, an OR circuit 43, a first timer circuit 44, and a second timer circuit 45.

The clock output circuit 40 outputs a clock signal q1 having a predetermined cycle to the first timer circuit 44. The clock signal q1 according to an embodiment of the present disclosure is, for example, a signal having the same cycle as the cycle of the drive signal Vdr, and may be the drive signal Vdr.

The reference voltage output circuit 41 outputs the reference voltage Vref3 having a level corresponding to the signal Vj, to the comparator circuit 42. For example, when the low signal Vj is outputted from the second timer circuit 45 which will be described later, the reference voltage output circuit 41 raises the level of the reference voltage Vref3. Meanwhile, when the high signal Vj is outputted, the reference voltage output circuit 41 drops the level of the reference voltage Vref3. The reference voltage Vref3 according to an embodiment of the present disclosure is set such that the reference voltage Vref3 of a first level (for example, 2.0V) is outputted in response to the high signal Vj and the reference voltage Vref3 of a second level (for example, 2.1 V) higher than the first level is outputted in response to the low signal Vj.

The comparator circuit 42 compares the voltage Vt at the terminal T in the off-state of the transistor 12 and the reference voltage Vref3. Specifically, a non-inverting input terminal of the comparator circuit 42 is coupled to the terminal T, and the comparator circuit 42 compares the voltage Vt and the reference voltage Vref3, and outputs a control signal Vc0 as a comparison result.

As described above, in an embodiment of the present disclosure, the voltage Vt in the on-state of the transistor 12 is the voltage Vs, while the voltage Vt in the off-state of the transistor 12 is $Vt = (Vzcd - 0.7) \times R14b + (R14a + R14b)$. Further, the reference voltage Vref3 is sufficiently higher than the voltage Vs in the on-state of the transistor 12, and is in a relationship illustrated in FIG. 3. In other words, the "reference voltage Vref3" is a voltage set between the lowest value of the voltage Vt1 and the lowest value of the voltage Vt2.

When the OR circuit 43 receives the high control signal Vc0 from the comparator circuit 42 and a high initialization signal ini1, the OR circuit 43 outputs a high control signal Vc1 to the first timer circuit 44. Note that the high control signal Vc1 resets a count value of the first timer circuit 44.

The first timer circuit 44 detects whether a time period in which the voltage Vt at the terminal T is lower than the reference voltage Vref3 has continued for a time period T1 (first predetermined time period). When the 200 V AC voltage Vac2 is inputted, the time period in which the voltage Vt is lower than the reference voltage Vref3 has continued for the time period T1. Accordingly, the first timer circuit 44 detects that the 200 V AC voltage Vac2 is inputted.

The first timer circuit 44 includes D flip-flops F1 to F3 equivalent to a 3-bit counter and an RS flip-flop F4. Although the D flip-flops F1 to F3 are configured in three stages, the configuration is not limited thereto.

A predetermined power supply voltage is applied to a D input of the D flip-flop F1, and a Q output of the D flip-flop F1 is inputted to a D input of the D flip-flop F2. A Q output of the D flip-flop F2 is inputted to a D input of the D flip-flop F3. In addition, the clock signal q1 is inputted to the D flip-flops F1 to F3. Accordingly, in the D flip-flops F1 to F3, when the reset is released and the clock signal q1 changes by an amount corresponding to three cycles, a Q output of the D flip-flop F3 goes high. In an embodiment of the present disclosure, it is assumed that a time period in which the clock signal q1 changes by the amount corresponding to three cycles is the "time period T1".

The Q output of the D flip-flop F3 is inputted to an S input of the RS flip-flop F4. Accordingly, when the Q output of the D flip-flop F3 goes high, a Q output of the RS flip-flop F4 also goes high. The Q output of the RS flip-flop F4 is inputted to an R input of the second timer circuit 45. Accordingly, when an output of the first timer circuit 44 goes high and the time period T1 is measured, in other words, when the 200 V AC voltage Vac2 is inputted, the second timer circuit 45 is reset.

The second timer circuit 45 measures, for example, a time period T2 (second predetermined time period) corresponding to the half cycle of the AC voltage Vac in response to a clock signal q2 from a clock output circuit (not illustrated). Specifically, the second timer circuit 45 increments a count value in response to the clock signal q2, and when the count value reaches a "count value X" indicating the time period T2, outputs the high signal Vj.

Note that, generally, a commercial frequency of the AC voltage Vac varies, for example, from 50 Hz to 60 Hz. It is assumed here that the "time period T2" is determined based on the lowest frequency (for example, 50 Hz) in the frequencies of the 100 V AC voltage Vac1 and the 200 V AC voltage Vac2.

Meanwhile, when the first timer circuit 44 detects the 200 VAC voltage Vac2 and the count value is reset, the second timer circuit 45 outputs the low signal Vj. Note that, when the second timer circuit 45 receives an initialization signal ini2, for example, the "count value X" is set and the second timer circuit 45 outputs the high signal Vj.

As such, in an embodiment of the present disclosure, the count value of the second timer circuit 45 is not reset unless the 200 V AC voltage Vac2 is detected. Accordingly, the high signal Vj (first signal) outputted from the second timer circuit 45 indicates that the inputted AC voltage Vac is the 100 V AC voltage Vac1.

Meanwhile, the low signal Vj (second signal) outputted from the second timer circuit 45 indicates that the inputted AC voltage Vac is the 200 V AC voltage Vac2.

=====Operation of AC-DC Converter 1=====

Figure 5:
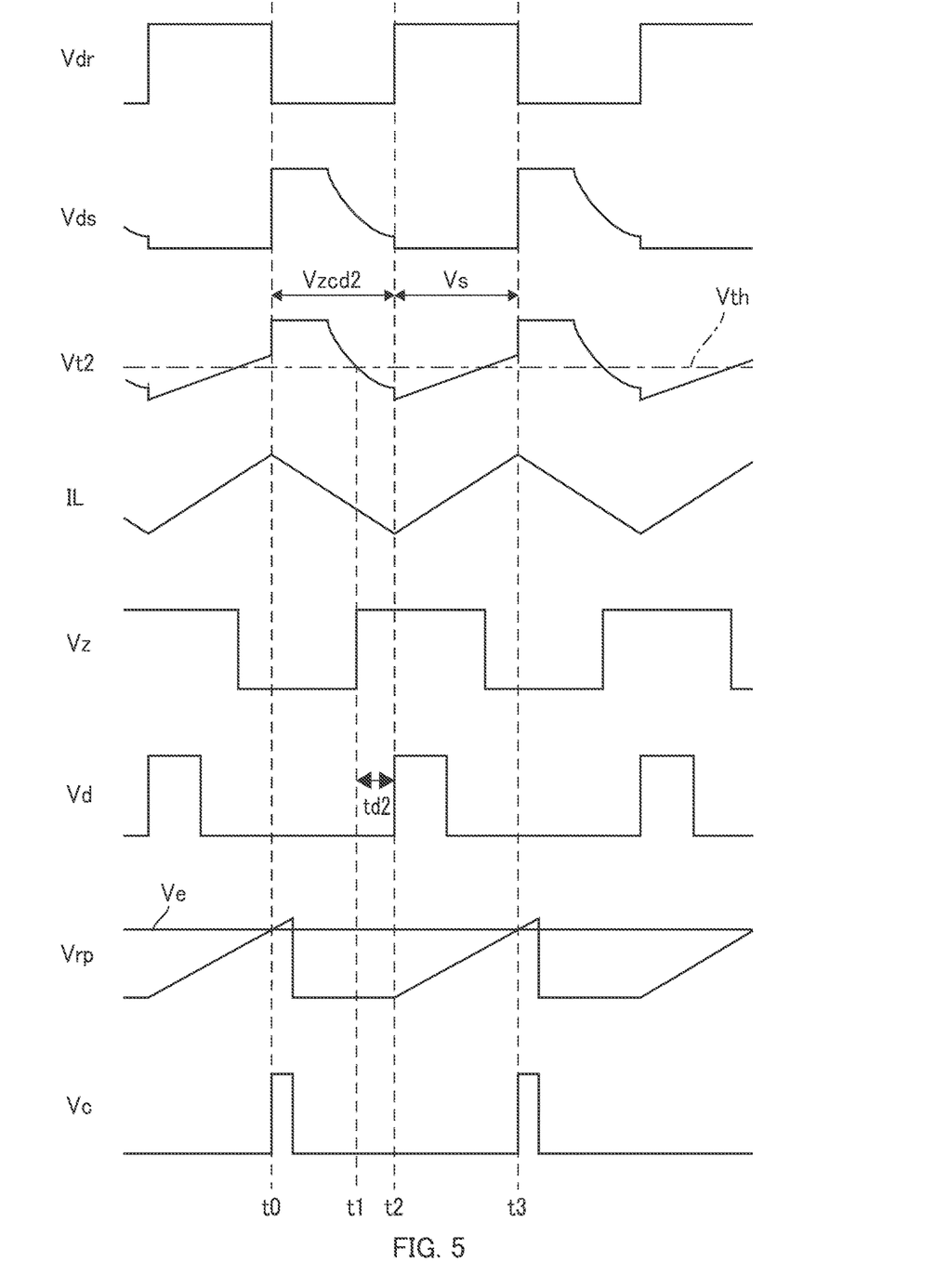
FIG. 5 is a diagram illustrating main waveforms of an AC-DC converter.

Operations of main circuits of the AC-DC converter 1 in the case where the 200 V AC voltage Vac2 is inputted will be described with reference to FIG. 5. First, at time t0, when the drive signal Vdr goes low and the transistor 12 is turned off, the voltage Vzcd2 of the secondary winding L2 increases to "Vout$-(2)^{1/2} \times$Vrec2$\times$(Ns/Np)" which is a positive voltage.

Then, when the inductor current IL decreases and the voltage generated in the primary winding L1 decreases in response to the turning-off of the transistor 12, the voltage Vzcd2 of the secondary winding L2 decreases. As a result, the voltage Vt2 at the terminal T also decreases.

Then, when the voltage Vt2 at the terminal T falls below the threshold voltage Vth at time t1, the zero current detection circuit 22 outputs the high signal Vz indicating that the inductor current IL has reached zero.

At time t2 when the predetermined amount of time td2, which is set according to the level of the signal Vj, has elapsed since the output of the high signal Vz at the time t1, the delay circuit 24 outputs the high signal Vd. Accordingly, the OR circuit 30 also outputs the high signal Vset and the flip-flop 32 outputs the high drive signal Vdr, to thereby turn on the transistor 12.

As described above, the delay time td (td1, td2) in the delay circuit 24 is set such that the transistor 12 is turned on at the timing at which the drain-source voltage Vds of the transistor 12 becomes small (for example, substantially zero). This reduces the switching loss in the transistor 12.

When the transistor 12 is turned on at time t2, the inductor current IL increases. At this time, the voltage Vzcd2 becomes a negative voltage as described above, and thus the diode 15 is turned off and the voltage Vs generated in the current sensing resistor 13 is applied to the terminal T. In other words, at this time, the voltage Vt2 results in Vt2=Vs.

In addition, at time t2, the ramp oscillator 26 outputs the ramp wave Vrp having a slope set according to the level of the signal Vj, in response to the input of the high signal Vset.

Then, at time t3, when the level of the ramp wave Vrp reaches the level of the error voltage Ve, the comparator circuit 28 outputs the high signal Vc and thus the high signal Vr is outputted to the flip-flop 32. Then, the flip-flop 32 outputs the low drive signal Vdr, to thereby turn off the transistor 12. Operations from time t0 to time t3 are repeated at time t3 and thereafter.

Here, while the AC-DC converter 1 generates the output voltage Vout of the target level and supplies power to a constant load, the feedback voltage Vfb and the error voltage Ve are constant. This results in the on period (for example, time t2 to time t3) of the transistor 12 being constant as well. When the level of the rectified voltage Vrec2 rises in the on-state of the transistor 12, the inductor current IL also increases. Accordingly, in such a case, the waveform indicating the peak of the inductor current IL is similar to the waveform of the rectified voltage Vrec2, and thus the power factor of the AC-DC converter 1 is improved.

Note that, although the case where the 200 V AC voltage Vac2 is inputted has been described here, the same applies to the case where the 100 V AC voltage Vac1 is inputted, except for differences in the delay time period td and the slope of the ramp wave Vrp.

«Operation of Input Detection Circuit 23»

Figure 6:
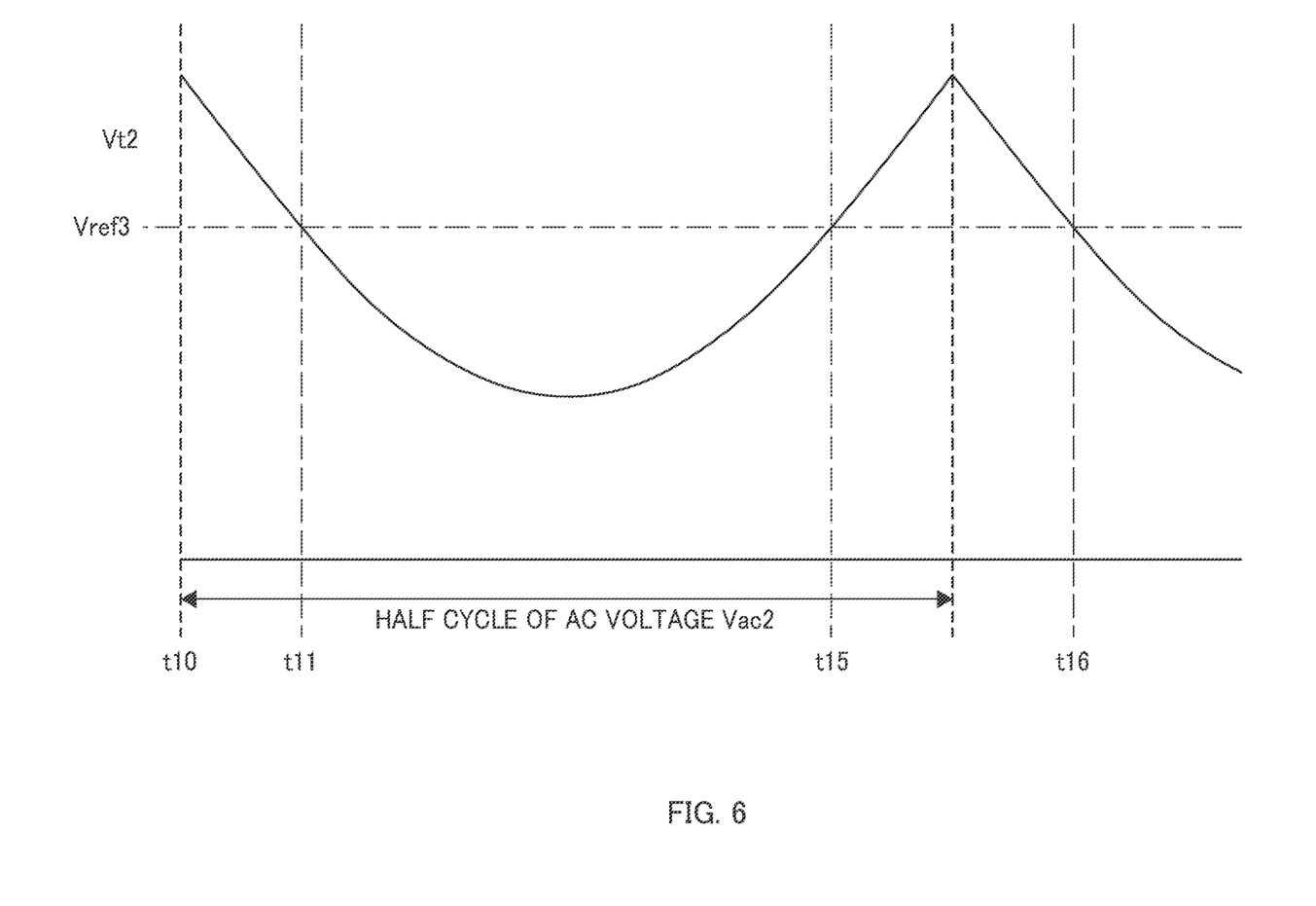
FIG. 6 is an example of a waveform of a voltage Vt2 in the case where a 200 V AC voltage Vac2 is inputted.
Figure 7:
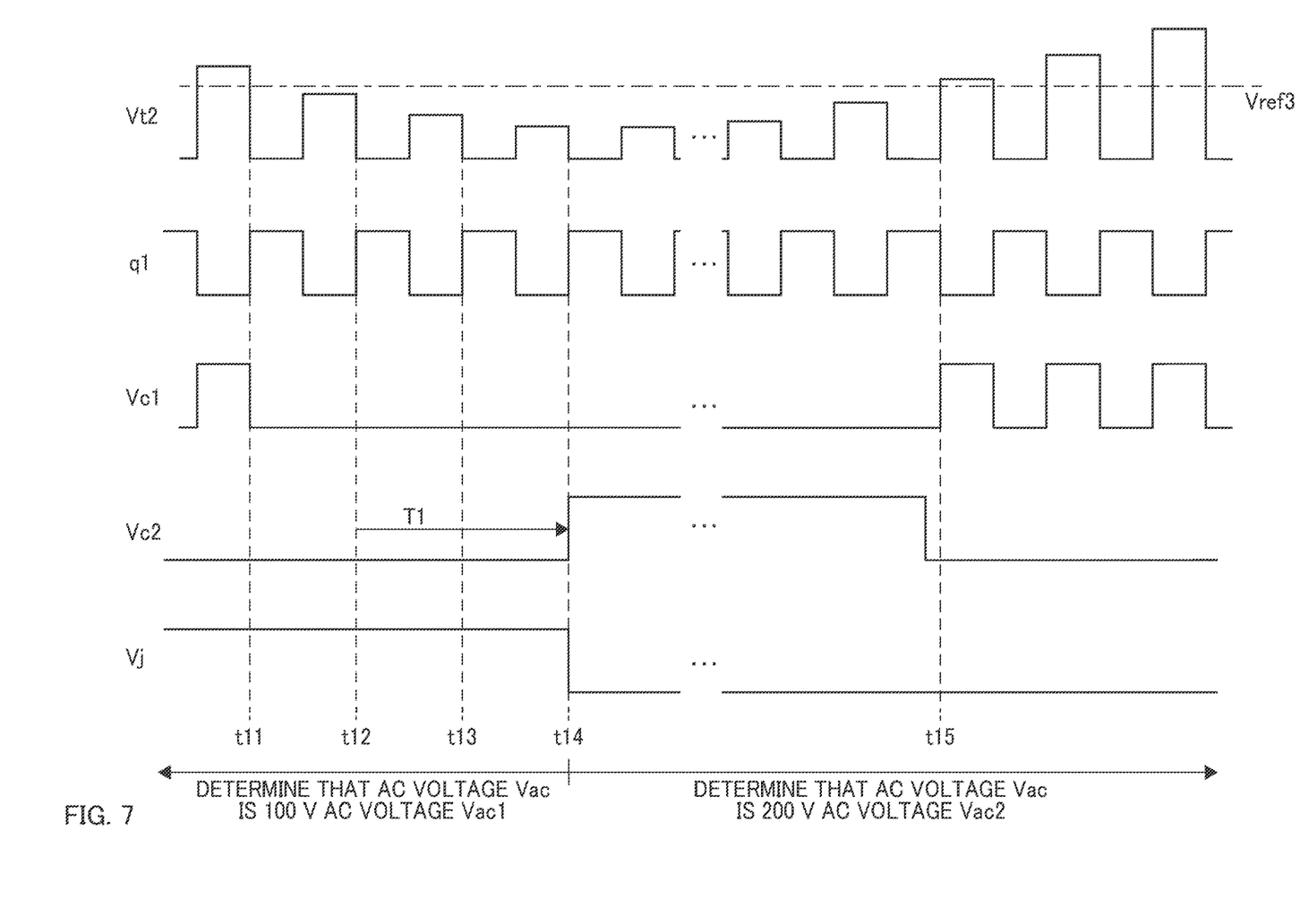
FIG. 7 is a diagram for explaining operations of an input detection circuit.

Next, an operation of the input detection circuit 23 in the case where the 200 V AC voltage Vac2 is inputted will be described.

FIG. 6 is an example of the voltage Vt2 in the case where the AC voltage Vac2 changes, and FIG. 7 is a diagram illustrating main waveforms in the input detection circuit 23.

It is assumed here that the initialization signals ini1, ini2 are inputted upon activation of the AC-DC converter 1 at time t10, and the first timer circuit 44 and the second timer circuit 45 are reset in the input detection circuit 23.

In the period from time t10 to time t11, when the voltage Vt2 is higher than the reference voltage Vref3, the high signal Vc0 is outputted from the comparator circuit 42 every time the transistor 12 is turned off.

As a result, the first timer circuit 44 continues being reset and thus the signal Vc2 outputted from the first timer circuit 44 does not go high and the second timer circuit 45 is not reset. Accordingly, the high signal Vj is outputted from the second timer circuit 45.

Since the voltage Vt2 falls below the reference voltage Vref3 at time t11 and thereafter, the signal Vc0 of the comparator circuit 42 and the signal Vc1 of the OR circuit 43 go low. Accordingly, the reset of the first timer circuit 44 is released.

When the clock signal q1 goes high at the time t12, the Q output of the D flip-flop F1 goes high. In addition, when the clock signal q1 goes high at time t13, the Q output of the D flip-flop F2 goes high, and, when the clock signal q1 goes high at time t14, the Q output of the D flip-flop F3 goes high. In other words, when the time period T1, in which the clock signal q1 goes high in times t12 to t14, has elapsed, the signal Vc2, which is the Q output of the RS flip-flop F4, goes high, and the second timer circuit 45 is reset.

As a result, the signal Vj from the second timer circuit 45 changes from high to low at time t14. In other words, the second timer circuit 45 determines that the AC voltage Vac is the 200 V AC voltage Vac2.

At time t15, the voltage Vt2 becomes higher than the reference voltage Vref3. Accordingly, the OR circuit 43 outputs the high signal Vc1 every time the transistor 12 is turned off as in the time period from time t10 to time t11. Hence, the first timer circuit 44 continues being reset, and thus the signal Vc2 outputted from the first timer circuit 44 is low.

Then, at time t15 and thereafter, the count value of the second timer circuit 45 is incremented in response to the clock signal q2.

Here, if the count value of the second timer circuit 45 is incremented in the time period T2 of the AC voltage Vac from time t15, the signal Vj from the second timer circuit 45 goes high. However, as illustrated in FIG. 6, the voltage Vt2 falls below the reference voltage Vref3 at time t16 after time t15, and the operation at time t11 is repeated. Accordingly, in an embodiment of the present disclosure, the count value of the second timer circuit 45 is not incremented during the time period T2 from time t15, and the second timer circuit 45 continues outputting the low signal Vj indicating that the AC voltage Vac is the 200 V AC voltage Vac2.

Although not illustrated in the drawings here, when the voltage inputted to the AC-DC converter 1 is the 100 V AC voltage Vac1, the second timer circuit 45 is not reset. Accordingly, in such a case, the second timer circuit 45 continues outputting the high signal Vj indicating that the AC voltage Vac is the 100 V AC voltage Vac1.

=====Summary=====

The AC-DC converter 1 according to an embodiment of the present disclosure has been described above. The drive circuit 20 according to an embodiment of the present disclosure detects the inductor current IL and the amplitude of the inputted AC voltage Vac based on the voltage Vt at the terminal T. Accordingly, the drive circuit 20 is not provided with two terminals in detecting two targets. Thus, in an embodiment of the present disclosure, it is possible to suppress an increase in the number of terminals even when there are multiple detection targets.

In addition, the comparator circuit 29 detects an overcurrent based on the voltage Vt at the terminal T in the on-state of the transistor 12. Accordingly, in an embodiment of the present disclosure, it is possible to suppress an increase in the number of terminals also in a case where an overcurrent is detected.

In addition, as illustrated in FIG. 3, the voltage Vt at the terminal T in the off-state of the transistor 12 changes with the amplitude (level) of the inputted AC voltage Vac. Accordingly, the input detection circuit 23 can determine whether the AC voltage Vac is the 100 V-based voltage or the 200 V-based voltage, based on the reference voltage Vref3 provided between the voltages Vt1 and Vt2.

In addition, it may be determined that the inputted AC voltage Vac is 200 V-based voltage, for example, immediately when the voltage Vt falls below the reference voltage Vref3. However, with such a configuration, there may be a case where the voltage Vt falls below the reference voltage Vref3 due to noise and/or the like, which may result in an erroneous determination. The input detection circuit 23 according to an embodiment of the present disclosure determines after a time period in which the voltage Vt is lower than the reference voltage Vref3 continues for the time period T1. This enables more accurate determination.

In addition, when the 200 V AC voltage Vac2 is inputted, the reference voltage output circuit 41 raises the level of the reference voltage Vref3. Accordingly, even if the voltage Vt fluctuates due to noise and/or the like, the input detection circuit 23 can accurately determine the type of the inputted AC voltage Vac. Note that, in an embodiment of the present disclosure, the reference voltage Vref3 is changed, however, similar effects can be obtained also in the case of the constant reference voltage Vref3 and the comparator circuit 42 with hysteresis, for example.

In addition, when the delay circuit 24 receives the high signal Vz from the zero current detection circuit 22, the delay circuit 24 outputs, to the OR circuit 30, the high signal Vd (first instruction signal) for switching on the transistor 12 after a lapse of a time period corresponding to the level of the signal Vj. Specifically, in the state where the high signal Vj is inputted to the delay circuit 24, the delay circuit 24 outputs the signal Vd for turning on the transistor 12 after the elapse of the amount of time td1 (first amount of time) since the detection of the inductor current IL reaching zero.

In addition, the change in the voltage Vds when the 100 V-based voltage is inputted is slower than the change in the voltage Vds when the 200 V-based voltage is inputted. The delay time td2 when the 200 V-based voltage is inputted is set shorter than the delay time td1 when the 100 V-based voltage is inputted, to reduce the switching loss in the transistor 12. Accordingly, the switching loss in the transistor 12 is reduced in an embodiment of the present disclosure.

In addition, the greater the amplitude of the AC voltage Vac is, the greater the inductor current IL in the on-state of the transistor 12 is. In an embodiment of the present disclosure, the ramp oscillator 26 is configured such that the slope S2 when the 200 V-based voltage is inputted is set steeper than the slope S1 in the case where the voltage 100 V is inputted. Accordingly, the greater the amplitude of the AC voltage Vac is, the shorter the on-time period of the transistor 12 is. Thus, the inductor current IL results in being substantially constant irrespective of the AC voltage Vac.

In addition, the diode 15 is provided between the terminal T and the secondary winding L2. Then, when the transistor 12 is on, the diode 15 is off, and, when the transistor 12 is off, the diode 15 is on. Thus, the voltage Vs, Vzcd is applied to the terminal T in response to the on, off of the transistor 12.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

For example, when the input detection circuit 23 is initialized by the initialization signals ini1, ini2, the input detection circuit 23 outputs the low determination result Vj indicating that the AC voltage Vac is the rated voltage of 200 V, for example. However, the input detection circuit 23 may be configured to output the high determination result Vj indicating that the AC voltage Vac is the rated voltage of 100 V.

The present disclosure enables provision of an integrated circuit that can suppress an increase in the number of terminals even when there are multiple detection targets.

What is claimed is:

1. An integrated circuit for a power supply circuit that includes
    a transformer including
        a primary winding to which a rectified voltage obtained by rectifying an alternating-current (AC) voltage is applied, and
        a secondary winding configured to induce a voltage having a polarity opposite to a polarity of a voltage generated in the primary winding, and
    a transistor configured to control an inductor current flowing through the primary winding,
the integrated circuit being configured to drive the transistor, the integrated circuit comprising:
    a terminal configured to receive a voltage corresponding to the voltage of the secondary winding when the transistor is in an off-state;
    a first detection circuit connected to the terminal, the first detection circuit being configured to receive, from the terminal, the voltage corresponding to the voltage of the secondary winding when the transistor is in the off-state, and to detect that a current value of the inductor current is smaller than a first current value, based on the received voltage in the off-state of the transistor; and
    a determination circuit connected to the terminal, the determination circuit being configured to receive, from the terminal, the voltage corresponding to the voltage of the secondary winding when the transistor is in the off-state, and to determine whether the AC voltage is a first AC voltage or a second AC voltage having an amplitude greater than an amplitude of the first AC voltage, based on the received voltage in the off-state of the transistor, the integrated circuit being configured to drive the transistor in response to a detection result of the first detection circuit, a determination result of the determination circuit, and an output voltage of the power supply circuit generated from the AC voltage, wherein
the determination circuit
    determines that the AC voltage is the first AC voltage based on a first time period in which the received voltage is higher than a reference voltage, and
    determines that the AC voltage is the second AC voltage based on a second time period in which the received voltage is lower than the reference voltage.

2. The integrated circuit according to claim 1, further comprising a second detection circuit, wherein
    the terminal is further configured to receive another voltage corresponding to a current flowing through the transistor when the transistor is in an on-state,
    the second detection circuit detects whether the current value of the inductor current is greater than a second current value, based on the received voltage in the on-state of the transistor, and
    the integrated circuit drives the transistor in response to the detection result of the first detection circuit, a detection result of the second detection circuit, the determination result of the determination circuit, and the output voltage of the power supply circuit.

3. The integrated circuit according to claim 1, wherein the determination circuit includes:
    a comparator circuit configured to compare the received voltage in the off-state of the transistor and the reference voltage;
    a first timer circuit configured to detect whether the second time period continues for a first predetermined time period; and
    a second timer circuit configured to
        output a first signal indicating that the AC voltage is the first AC voltage as the determination result, when the first time period continues for a second predetermined time period, and
        output a second signal indicating that the AC voltage is the second AC voltage as the determination result, when the first timer circuit detects that the second time period continues for the first predetermined time period.

4. The integrated circuit according to claim 3, wherein the determination circuit further includes a reference voltage output circuit configured to
    output the reference voltage at a first level in response to the first signal, and
    output the reference voltage at a second level higher than the first level in response to the second signal.

5. The integrated circuit according to claim 3, further comprising a delay circuit configured to
    output a first instruction signal for turning on the transistor, after elapse of a first amount of time since detection of the current value of the inductor current being smaller than the first current value, in a state where the first signal is inputted to the delay circuit, and
    output the first instruction signal for turning on the transistor, after elapse of a second amount of time since the detection of the current value of the inductor current being smaller than the first current value, in a state where the second signal is inputted to the delay circuit, the second amount of time being shorter than the first amount of time.

6. The integrated circuit according to claim 5, further comprising:
an oscillator circuit configured to
output a ramp wave having a first slope after an output of the first instruction signal, when the first signal is inputted to the oscillator circuit, and
output the ramp wave having a second slope steeper than the first slope after the output of the first instruction signal, when the second signal is inputted to the oscillator circuit;
an error amplifier circuit configured to output an error voltage corresponding to an error between a level of the output voltage and a target level of the output voltage; and
a signal output circuit configured to output a second instruction signal for turning off the transistor, responsive to the ramp wave being higher than the error voltage.

7. The integrated circuit according to claim 1, wherein the power supply circuit further comprises:
a diode provided between the terminal and the secondary winding, and
a resistor provided between the transistor and the terminal, for detecting a current flowing through the transistor.

8. An integrated circuit for a power supply circuit that includes
a transformer including
a primary winding to which a rectified voltage obtained by rectifying an alternating-current (AC) voltage is applied, and
a secondary winding configured to induce a voltage having a polarity opposite to
a polarity of a voltage generated in the primary winding, and
a transistor configured to control an inductor current flowing through the primary winding,
the integrated circuit being configured to drive the transistor, the integrated circuit comprising:
a terminal configured to receive a voltage corresponding to the voltage of the secondary winding when the transistor is in an off-state;
a first detection circuit connected to the terminal, the first detection circuit being configured to receive, from the terminal, the voltage corresponding to the voltage of the secondary winding when the transistor is in the off-state, and to detect that a current value of the inductor current is smaller than a first current value, based on the received voltage in the off-state of the transistor;
a second detection circuit connected to the terminal, the second detection circuit being configured to receive, from the terminal, another voltage corresponding to a current flowing through the transistor when the transistor is in an on-state, and to detect whether the current value of the inductor current is greater than a second current value, based on said another voltage in the on-state of the transistor; and
a determination circuit configured to determine whether the AC voltage is a first AC voltage or a second AC voltage having an amplitude greater than an amplitude of the first AC voltage, based on the received voltage in the off-state of the transistor, wherein
the integrated circuit drives the transistor in response to a detection result of the first detection circuit, a detection result of the second detection circuit, and the output voltage of the power supply circuit,
the integrated circuit is further configured to drive the transistor in response to the detection result of the first detection circuit, the determination result of the determination circuit, and the output voltage of the power supply circuit generated from the AC voltage, and
the determination circuit
determines that the AC voltage is the first AC voltage based on a first time period in which the received voltage is higher than a reference voltage, and
determines that the AC voltage is the second AC voltage based on a second time period in which the received voltage is lower than the reference voltage.

9. The integrated circuit according to claim 8, wherein the determination circuit includes:
a comparator circuit configured to compare the received voltage in the off-state of the transistor and the reference voltage;
a first timer circuit configured to detect whether the second time period continues for a first predetermined time period; and
a second timer circuit configured to
output a first signal indicating that the AC voltage is the first AC voltage as the determination result, when the first time period continues for a second predetermined time period, and
output a second signal indicating that the AC voltage is the second AC voltage as the determination result, when the first timer circuit detects that the second time period continues for the first predetermined time period.

10. The integrated circuit according to claim 9, wherein the determination circuit further includes a reference voltage output circuit configured to
output the reference voltage at a first level in response to the first signal, and
output the reference voltage at a second level higher than the first level in response to the second signal.

11. The integrated circuit according to claim 9, further comprising a delay circuit configured to
output a first instruction signal for turning on the transistor, after elapse of a first amount of time since detection of the current value of the inductor current being smaller than the first current value, in a state where the first signal is inputted to the delay circuit, and
output the first instruction signal for turning on the transistor, after elapse of a second amount of time since the detection of the current value of the inductor current being smaller than the first current value, in a state where the second signal is inputted to the delay circuit, the second amount of time being shorter than the first amount of time.

12. The integrated circuit according to claim 11, further comprising:
an oscillator circuit configured to
output a ramp wave having a first slope after the output of the first instruction signal, when the first signal is inputted to the oscillator circuit, and
output the ramp wave having a second slope steeper than the first slope after the output of the first instruction signal, when the second signal is inputted to the oscillator circuit;
an error amplifier circuit configured to output an error voltage corresponding to an error between a level of the output voltage and a target level of the output voltage; and a signal output circuit configured to output a second instruction signal for turning off the transistor, responsive to the ramp wave being higher than the error voltage.

13. The integrated circuit according to claim 8, wherein the power supply circuit further comprises:
   a diode provided between the terminal and the secondary winding, and
   a resistor provided between the transistor and the terminal, for detecting a current flowing through the transistor.

14. An integrated circuit for a power supply circuit that includes
   a transformer including
      a primary winding to which a rectified voltage obtained by rectifying an alternating-current (AC) voltage is applied, and
      a secondary winding configured to induce a voltage having a polarity opposite to a polarity of a voltage generated in the primary winding, and
   a transistor configured to control an inductor current flowing through the primary winding,
the integrated circuit being configured to drive the transistor, the integrated circuit comprising:
   a terminal configured to receive a voltage corresponding to the voltage of the secondary winding when the transistor is in an off-state;
   a first detection circuit connected to the terminal, the first detection circuit being configured to receive, from the terminal, the voltage corresponding to the voltage of the secondary winding when the transistor is in the off-state, and to detect that a current value of the inductor current is smaller than a first current value, based on the received voltage in the off-state of the transistor;
   a determination circuit configured to output
      a first signal that indicates the AC voltage being a first AC voltage, and
      a second signal that indicates the AC voltage being a second AC voltage having an amplitude greater than an amplitude of the first AC voltage;
   a delay circuit configured to output a first instruction signal for turning on the transistor;
   an oscillator circuit configured to
      output a ramp wave having a first slope after the output of the first instruction signal, when the first signal is inputted to the oscillator circuit, and
      output the ramp wave having a second slope steeper than the first slope after the output of the first instruction signal, when the second signal is inputted to the oscillator circuit;
   an error amplifier circuit configured to output an error voltage corresponding to an error between a level of an output voltage of the power supply circuit and a target level of the output voltage; and
   a signal output circuit configured to output a second instruction signal for turning off the transistor, responsive to the ramp wave being higher than the error voltage, wherein
   the integrated circuit is configured to drive the transistor in response to a detection result of the first detection circuit, the first signal, the second signal, and the output voltage of the power supply circuit, and
   the determination circuit
      determines that the AC voltage is the first AC voltage based on a first time period in which the received voltage is higher than a reference voltage, and
      determines that the AC voltage is the second AC voltage based on a second time period in which the received voltage is lower than the reference voltage.

15. The integrated circuit according to claim 14, wherein the delay circuit configured to
   output the first instruction signal for turning on the transistor, after elapse of a first amount of time since detection of the current value of the inductor current being smaller than the first current value, in a state where the first signal is inputted to the delay circuit, and
   output the first instruction signal for turning on the transistor, after elapse of a second amount of time since the detection of the current value of the inductor current being smaller than the first current value, in a state where the second signal is inputted to the delay circuit, the second amount of time being shorter than the first amount of time.

16. The integrated circuit according to claim 14, wherein the determination circuit includes:
   a comparator circuit configured to compare the received voltage in the off-state of the transistor and the reference voltage;
   a first timer circuit configured to detect whether the second time period continues for a first predetermined time period; and
   a second timer circuit configured to
      output the first signal indicating that the AC voltage is the first AC voltage as the determination result, when the first time period continues for a second predetermined time period, and
      output the second signal indicating that the AC voltage is the second AC voltage as the determination result, when the first timer circuit detects that the second time period continues for the first predetermined time period.

17. The integrated circuit according to claim 16, wherein the determination circuit further includes a reference voltage output circuit configured to
   output the reference voltage at a first level in response to the first signal, and
   output the reference voltage at a second level higher than the first level in response to the second signal.

18. The integrated circuit according to claim 14, wherein the power supply circuit further comprises:
   a diode provided between the terminal and the secondary winding, and
   a resistor provided between the transistor and the terminal, for detecting a current flowing through the transistor.

* * * * *